United States Patent [19]

Tavis

[11] 3,739,196

[45] June 12, 1973

[54] FUNCTION GENERATOR

[75] Inventor: John R. Tavis, Mariposa, Calif.

[73] Assignee: Tavis Corporation, Mariposa, Calif.

[22] Filed: Sept. 23, 1971

[21] Appl. No.: 183,067

[52] U.S. Cl.................. 307/229, 328/143, 328/145
[51] Int. Cl.......................... G06g 7/24, H01h 35/00
[58] Field of Search........................... 307/229, 230; 328/145, 143; 235/197

[56] References Cited
UNITED STATES PATENTS

| 3,523,195 | 8/1970 | Thomas et al. | 307/229 |
| 3,277,318 | 10/1966 | Bedford | 328/143 |
| 3,480,793 | 11/1969 | Strauss | 328/145 |

Primary Examiner—John W. Huckert
Assistant Examiner—B. P. Davis
Attorney—Leo J. Young, Robert L. Parker and C. Russell Hale et al.

[57] ABSTRACT

A function generator comprises an openable and closeable series-circuit path having a node and which is closed only while a voltage at the node has a predetermined polarity with respect to a threshold voltage. An emitter-follower circuit has a transistor biased by a substantially constant voltage source and a resistor divider network. A transistor operated as a diode so as to have at most unity current-gain cooperates with the emitter follower to determine the transition between opening and closing the series-circuit path. The base-emitter junctions of the diode-operated transistor and the emitter-follower transistor have opposed voltage differences which are substantially equal despite temperature variations so that a highly precise transition is achieved. The closing of the series-circuit path causes current to flow therethrough and such current does not substantially affect the biasing of the emitter-follower because of its current gain characteristic.

In a preferred embodiment, each of a plurality of shunting resistors is connectable in parallel with each other and in series with a voltage dropping resistor driven by an operational amplifier. Each shunting resistor is operatively connected at a different threshold so that the function generator has a non-linear voltage transmission characteristic made up of a plurality of linear segments.

9 Claims, 3 Drawing Figures

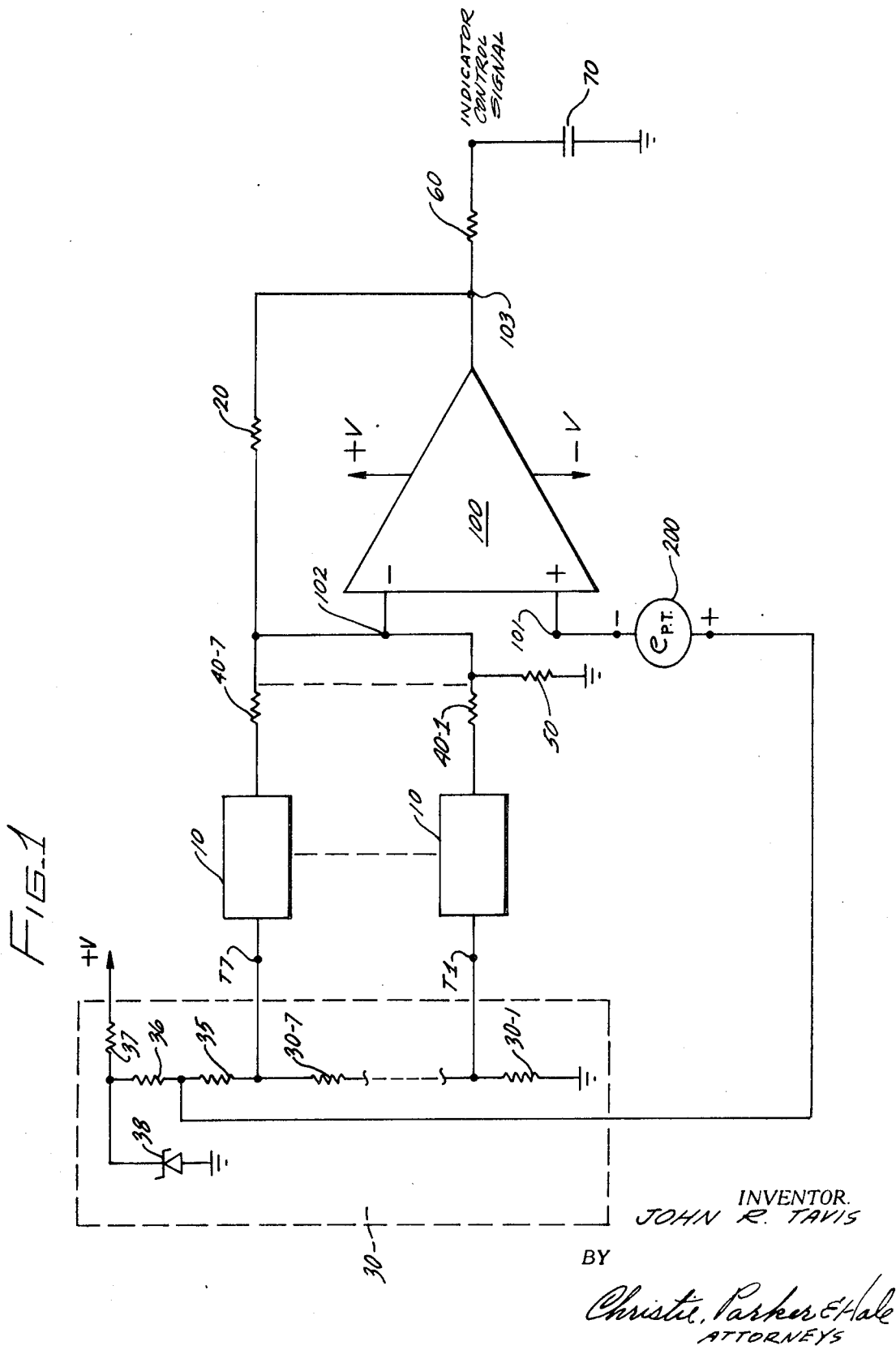

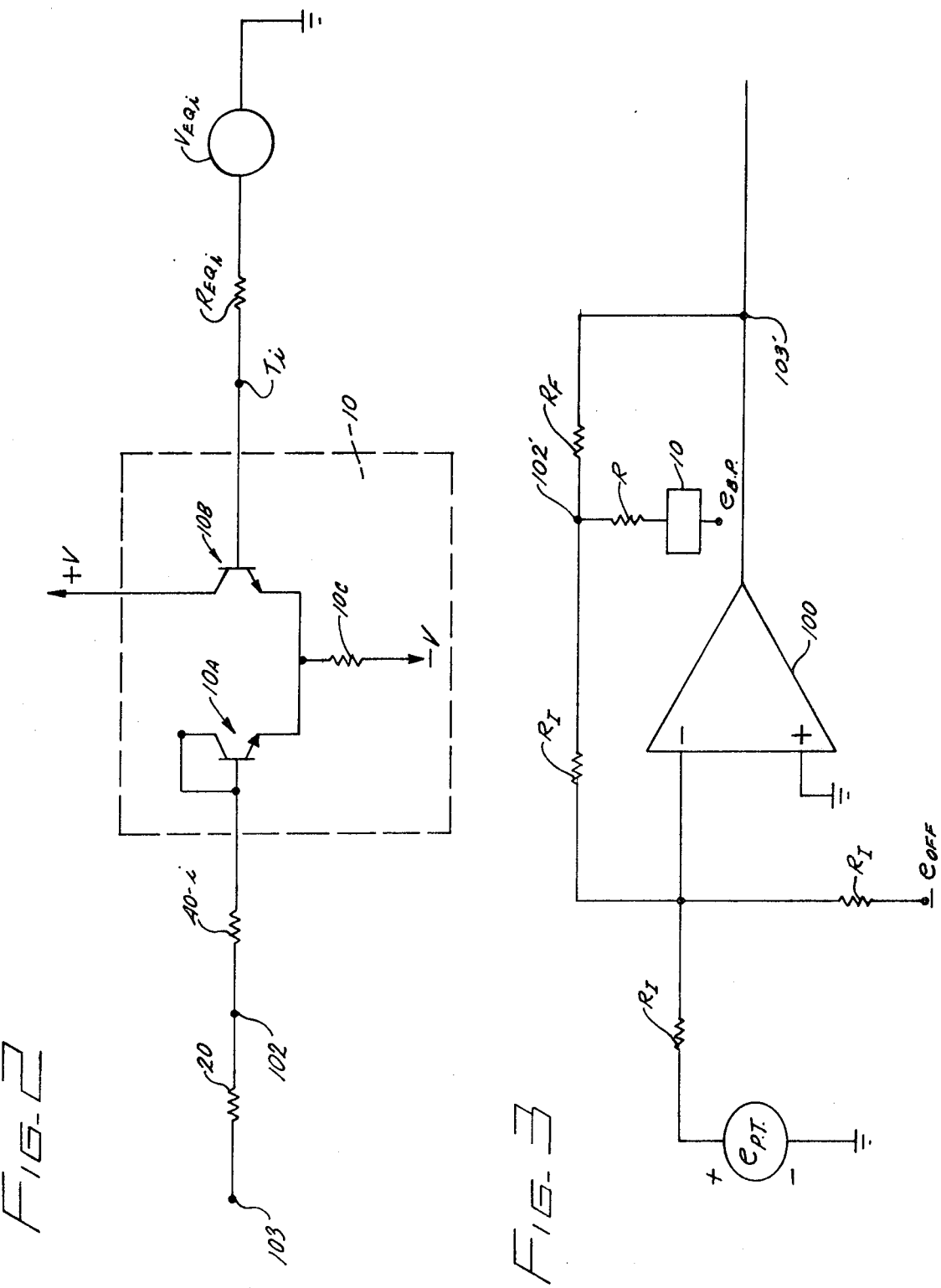

FUNCTION GENERATOR

BACKGROUND OF THE INVENTION

1. Field of the Invention

This invention relates generally to analog circuits, and more particularly to analog function generator circuits having piece-wise linear voltage transmission characteristics.

2. Description of the Prior Art

In instrumentation systems, in analog computer systems, and in related arts, a need arises for function generating circuits. For example, consider an airplane instrumentation system having a pressure transducer for providing an analog signal indicative of airplane altitude. Generally such transducers have a non-linear gain characteristic which falls off with increasing altitude. Thus, as the airplane rises in altitude from ground level to say 10,000 feet, the indicating signal changes by one amount; and then as the airplane rises from 10,000 to 20,000 feet, the indicating signal changes by a different, smaller amount. It is of course preferable to provide an indicating signal which is linearly related to the altitude of the airplane.

Various function generator circuits are known in the art which could be used for linearizing the non-linear signal produced by the pressure transducer. One class of prior art function generators relies upon the small-signal characteristics of solid-state devices such as the logarithmic relationship between transistor collector current and base-emitter voltage. A problem with this class of function generator resides in the variability of these small signal characteristics. Wide differences in these characteristics occur in the same type of device because of manufacturing tolerances; consequently it is difficult to produce these function generators in quantities with uniform characteristics.

Another class of function generators relies upon the large signal characteristics of diodes whereby the diode has a low impedance when forward biased beyond its characteristic junction threshold voltage and has a high impedance otherwise.

An example of this class of function generator comprises a voltage dropping resistor connected in series between a source of an analog signal and a common node. A resistor divider network having a series of taps provides a series of threshold voltages. Connected in series between each tap and the common node is a diode and a shunting resistor. The diodes serve as switches to connect and disconnect the shunting resistors in accordance with the polarity of the voltage at the common node with respect to the voltage at the tap. The voltage transmission from the source to the common node is a function of the number of shunting resistors which are switched into the circuit.

While the above-described circuit is generally satisfactory in some applications, it has certain drawbacks which make it unsuitable for precision circuits. First of all, the transition between non-conducting and conducting condition of the diode is difficult to predict. At the low current levels established near the transition, the impedance of the diode varies greatly in accordance with a logarithmic relationship. The diode junction voltage drop is temperature sensitive and varies significantly in a range from about 0.2 VDC at +165°F to about 1.VDC at −65°F. Secondly, the current flowing through each diode and shunting resistor also flows into the resistor divider network. Thus the voltages developed at the taps of the resistor divider network change as each shunt resistor is operatively connected into conduction. If the resistor divider network is designed with relatively low resistance values in an attempt to minimize this effect, the power consumption of the circuit increases correspondingly. Finally, because of the difficulty of predicting the transitions it has been necessary to select the resistor values on a trial and error basis to trim the circuit to have some desired characteristic. And, since such trimming is necessary, it is difficult to produce quantities of the function generators with uniform characteristics for precision instruments.

In another prior-art circuit similar in principle to that described above, pairs of oppositely poled diodes are connected together in an attempt to eliminate the undesirable effects of the variation in junction voltage by a compensation technique. However, the problem concerning the unpredictability of the transition is not solved by this approach.

SUMMARY OF THE INVENTION

The present invention provides an arrangement whereby a function generator has highly predictable and temperature insensitive breakpoints. Similar to prior-art arrangements, the function generator includes a first impedance having a first terminal for receiving a voltage signal and a second terminal forming a common node. A second impedance is connectable to form a series circuit path when a voltage at the common node has a predetermined polarity with respect to a threshold voltage. A circuit having a tap is provided for establishing the threshold voltage.

In contrast to prior art function generator circuits, no substantial amount of current flows between the common node and the tap upon connection of the second impedance to load down the common node. Thus the tapped circuit can comprise relatively high resistance value elements and consequently consume relatively low power as compared with prior art arrangements. Furthermore, the undesirable effect of a change of the voltage established at the tap is substantially eliminated.

This feature of the present invention results from the provision of novel means for connecting the second impedance into the series-circuit path with the first impedance. The connecting means comprises the following: One, a current-summing path such as an impedance connected to a source of potential, a constant-current source transistor circuit arrangement, or the like. When the second impedance is operatively connected for current flow therethrough, such current flows into the current-summing path. Two, a semiconductor device having a junction connected in series between the common node and the current-summing path. Although it is within the scope of this invention to use a diode as this semiconductor device, preferably the semiconductor device is a transistor having its collector electrode directly connected to its base electrode and operating in a manner similar to a diode. That is, this transistor has unity current gain when the junction is forward-biased and substantially no current gain when the junction is reverse-biased. Three, a transistor connected between the tapped circuit and the current-summing path in current-gain configuration. Thus an embodiment employing a n-p-n transistor, the current flowing into the current-summing path out of the emitter electrode is substantially greater than the current flowing into the base electrode out of the circuit tap. By virtue of this current-gain configuration, the increase in the amount of current flowing in the current-summing path incident to the introduction of the second impedance does not cause a substantial change in the base current of the transistor. Consequently the voltage provided at the circuit tap remains substantially constant. Another advantage results from the current-gain configuration and relates to the effect of the operating point of the emitter-follower transistor on the breakpoint. Preferably the operating point is established such that a sufficient amount of emitter current flows to operate the base-emitter junction in a lower-resistance region of its characteristic curve. By virtue of the current-gain of the emitter-follower, a relatively high emitter current is achieved without loading down the circuit tap.

In a preferred embodiment, each of a plurality of shunting resistors is connectable in parallel with each other and in series with a voltage dropping resistor driven by an operational amplifier. Each shunting resistor is operatively connected at a different threshold so that the function generator has a non-linear voltage transmission characteristic made up of a plurality of linear segments.

BRIEF DESCRIPTION OF THE DRAWINGS

FIG. 1 is a block and schematic diagram of apparatus including a pressure transducer and a function generator for producing a linear indication of altitude and embodying the present invention;

FIG. 2 is a schematic diagram illustrating a preferred embodiment of the circuitry used in each block 10 of FIG. 1 and embodying the present invention; and FIG. 3 is a block and schematic diagram illustrating an alternate arrangement of the apparatus of FIG. 1.

DETAILED DESCRIPTION

A conventional pressure transducer 200 shown in FIG. 1 is a source of an analog signal. While this analog signal is linearly proportional to pressure, it is a non-linear function of altitude. In addition, this analog voltage has an "offset". That is, it is non-zero at sea level. For these reasons, it is inconvenient to use this analog signal directly as an indicator control signal for driving a meter or the like. Instead, it is preferable to provide an indicator control signal that is 0 volts at sea level and that is linearly proportional to altitude. As will be discussed in detail hereinafter, the indicator control signal produced by a specific embodiment of this invention is 0 volts at sea level and changes 1.25 volts for each 10,000 feet of increased altitude.

A conventional operational amplifier 100 has a non-inverting amplifier input terminal 101, an inverting amplifier input terminal 102, and an amplifier output terminal 103. Preferably, amplifier 100 is of the integrated-circuit type to minimize power consumption. A feedback resistor 20 is connected between the output and inverting terminals of the amplifier. A resistor 50 is connected between the inverting input terminal and ground (0 volts). The relative values of resistors 20 and 50 establish the minimum voltage transmission ratio between the voltages at terminals 103 and 101. That is, the ratio of the voltage magnitude between terminal 103 and ground potential divided by the voltage magnitude is equal to $1 + (R_F/R_I)$ between terminal 101 and ground potential where $R_F$ is the value of resistor 20 and $R_I$ is the value of resistor 50. Thus, decreasing the effective value of $R_I$ increases the voltage transmission ratio.

A resistor 60 and a capacitor 70 are series connected between terminal 103 and ground to form a low-pass filter which eliminates high-frequency noise from the indicator control signal.

A plurality of resistors 40-1 through 40-7 (not all shown) are provided, each for decreasing the effective value of $R_I$ at a preselected altitude. Each resistor 40-1 through 40-7 has one end connected to terminal 102 which forms a common node and is connectable in parallel with each other and in series with the resistor 20.

Included within dashed block 30 is a resistor divider network comprising resistors 30-1 through 30-7 (not all shown) and having a plurality of taps T1 through T7 (not all shown). A conventional Zener-diode 38 has its anode electrode at ground potential and is biased into conduction by a resistor 37 connected in series between its cathode electrode and a power supply indicated as +V. The voltage developed at the cathode electrode of the Zener-diode is substantially constant despite temperature changes, power supply voltage variations, and other like changes.

Tap T7 is coupled to the cathode electrode of the Zener-diode by series-connected resistors 35 and 36. The junction of resistors 35 and 36 is connected to one end of pressure transducer 200. In operation, a bias voltage is established at this junction and the bias voltage cancels the offset voltage of the transducer so that the output voltage of the operational amplifier is 0 volts at sea level.

Each tap T1 through T7 is associated with a respective one of the resistors 40-1 through 40-7. Each tap is coupled to its associated resistor through a respective block 10, the internal details of which are shown in FIG. 2. In operation, when a voltage signal developed at the common node (terminal 102) has a predetermined polarity with respect to the voltage existing at one of the taps, the circuitry within the corresponding block 10 responds to operatively connect the associated resistor 40 into series-circuit relationship with resistor 20 and into parallel circuit relationship with resistor 50.

In operation the voltage developed at terminal 101 at sea level altitude is 0 volts. In response to this input, amplifier 100 produces 0 volts at its output terminal 103. Feedback resistor 20 thus couples 0 volts to the common node 102. With 0 volts at the common node, none of blocks 10 connect in their associated resistors. Thus the voltage transmission ratio from terminal 101 to 103 is determined by the ohmic values of resistors 20 and 50.

At a predetermined altitude, say 10,000 feet, the voltage developed at terminal 101 is substantially equal to the voltage developed at tap T1. Thus for altitudes above 10,000 feet, resistor 40-1 is connected in parallel circuit relationship with resistor 50. Now the above-mentioned voltage transmission ratio is determined by the ratio of the ohmic values of resistor 20 and the parallel combination of resistors 50 and 40-1. Thus there is provided piece-wise linear segments having a first slope below 10,000 feet and a second, higher slope above 10,000 feet.

In general, each incremental increase of 10,000 feet in altitude results in connecting-in an additional one of the resistors 40-1 through 40-7 and consequently seven slope changes are achieved. Eventually, for altitudes above 70,000 feet the voltage transmission ratio is determined by the ratio of the ohmic values of resistor 20 and the parallel combination of resistor 50 and the resistors 40-1 through 40-7.

Consider now the performance characteristics which would be ideal for the individual blocks 10. For ideal operation, each block 10 presents an open circuit unless the voltage developed at the common node is more positive than the voltage developed at the associated tap. This performance characteristic assures for example that the ohmic value of resistor 40-7 has no effect on the voltage transmission ratio below 70,000 feet. Any difference between the voltage level at which block 10 operatively connects in its associated resistor and the voltage at the tap is a deviation from ideal performance.

Also for ideal performance each block 10 presents zero ohms series resistance between its associated resistor and a threshold voltage while the resistor is connected in. This performance characteristic assures that the voltage transmission ratio depends solely upon the ohmic values of the resistors which of course can be held to very close tolerances for precision operation. Thus, any non-zero series resistance, particularly a variable one, is a deviation from ideal performance. Also for ideal performance, the voltage level existing at the taps is unaffected by the connecting-in of the individual resistors. This performance characteristic assures, for example, the connecting-in of resistor 40-1 will have no effect on the altitude at which resistor 40-2 is connected-in.

Consider now FIG. 2. Feedback resistor 20 is shown having terminal 103 for receiving a first voltage signal (i.e. the output voltage of amplifier 100) and having terminal 102 which forms a common node. An arbitrary one of the resistors 40-1 through 40-7 is shown and identified as 40-$i$.

The tap associated with this arbitrary resistor is shown and identified as T$i$. A resistor REQ$_i$ and a voltage source SEQ$_i$ are shown in series connection between tap T$i$ and ground (0 volts). This resistor and voltage source represent the Thevenin equivalent circuit of the portion of the circuit within block 30 of FIG. 1 involved in setting the threshold or breakpoint for resistor 40-$i$.

Within block 10 there is shown a resistor 10C which has one end connected to a source of negative d.c. voltage and which forms a current-summing path. A transistor 10B is connected between the tap T$i$ and the current-summing path in current-gain configuration. That is, the amount of emitter current flowing into the current-summing path from transistor 10B far exceeds the amount of base current drawn into transistor 10B from tap T$i$. A transistor 10A is connected in series between the resistor 40-$i$ and the current-summing path. Transistor 10A has its collector electrode directly connected to its base electrode and resistor 40-$i$. The internal base-emitter junction of the transistor 10A is poled so that it conducts only while the voltage developed at common node 102 is more positive than the voltage existing at tap T$i$.

There are several important advantages of the arrangement shown in FIG. 2 in substantially achieving the above-described ideal performance characteristics.

First, the transistor 10A presents a resistance value of millions of ohms while its base-emitter junction is reverse-biased and substantially achieves the ideal open-circuit performance characteristic.

Second, the opposed junctions of transistors 10A and 10B have conduction-threshold voltages which are substantially equal despite temperature variations. In an actual embodiment of this arrangement, it has been found that the difference in voltage between the base electrode of transistors 10A and 10C is in a range of only 0.04 volts to 0.07 volts. Thus the ideal performance characteristic of no difference between the connecting-in threshold voltage and the voltage at the tap is substantially achieved. This advantage is attributable in part to the preferred manner in which transistor 10B is biased. Thus the preferred embodiment takes advantage of the logarithmic relationship between emitter current and base-emitter junction voltage and transistor 10B is operated with sufficient nominal emitter current so that variations in the emitter current do not result in substantial variations in base-emitter junction voltage. Furthermore, because of the current-gain configuration, a relatively high nominal emitter current is achieved without loading down the voltage at tap T$i$.

Third, the unity-current-gain feature of transistor 10A and the relatively high current-gain feature of transistor 10B combine to provide the equivalent of a relatively low resistance in series with a threshold voltage and thereby substantially achieve one of the ideal performance characteristics. This arrangement takes advantage of the fact that the equivalent output impedance of an emitter-follower circuit is substantially equal to the source impedance biasing the emitter follower divided by the current-gain parameter ($\beta$) of the transistor. With a typical $\beta$ of about 100, an equivalent output impedance of only 20 ohms is achieved with a source impedance of 2,000 ohms. It should also be noted that the diode operation of transistor 10A plays an important role in bringing about the achievement of this characteristic. Thus, if transistor 10A were connected in current-gain configuration an undesirable relatively high input impedance would result.

Fourth, owing to the current-gain configuration of transistor 10B, the voltage produced at tap T$i$ is substantially unaffected by the connecting-in of resistor 40-$i$. To understand this feature, consider the following example of operation of a specific embodiment. Assume that transistor 10B has a $\beta$ of 100 and carries a nominal emitter current of 100 microamps. The nominal base current is then equal to 1 microamp. When the resistor 40-$i$ is not operatively connected in the current-summing path, resistor 10C carries only the emitter current of 100 microamps. Assume further that the ohmic value of resistor 10C is 150,000 ohms and the negative power supply is −15 volts. Under these conditions, the current-summing path can be considered as a constant-current sink. Thus when resistor 40-$i$ is operatively connected in, the current it delivers into the current-summing path causes a corresponding decrease in the emitter current of transistor 10C. In a specific embodiment of the present invention, the maximum decrease of emitter current is about 15 microamps. Since transistor 10C has a $\beta$ of 100 its base current will vary only by a maximum of 0.15 microamps. Thus, with an equivalent source impedance of about 2,000 ohms, there is a change of only 0.03 volts at the tap T$i$ incident to the connecting-in of the resistor 40-$i$.

One of the advantages of the present invention resides in the ease with which the breakpoints of the function generator can be calculated. Since the voltages produced at the taps are substantially unaffected by the connecting-in of the resistors, it is possible to calculate the resistance values of the circuit according to simple equations that accurately predict circuit behavior. Table I below lists the circuit values and parameters for a specific embodiment designed in accordance with the following specifications.

A. Design specifications
1. Output voltage produced at terminal 103 must be substantially linear with altitude from sea level to 80,000 feet;
2. Full scale output voltage must equal 10 VDC corresponding to 80,000 feet;
3. A breakpoint must be provided for each 10,000 foot increment;
4. Output voltage must be 0 VDC at sea level;
5. Pressure transducer output voltage is linearly proportional to pressure (non-linear with respect to altitude) and varies from 2.656 VDC at sea level to 0.06 VDC at 80,000 feet.

TABLE I

| Resistor | Ohmic Value | Resistor | Ohmic Value |
|---|---|---|---|
| 20 | 60.4K | 37 | 1K |
| 30-1 | 2.55K | 40-1 | 110K |
| 30-2 | 1.74K | 40-2 | 72.7K |
| 30-3 | 1.24K | 40-3 | 46.7K |
| 30-4 | 855 | 40-4 | 24.5K |
| 30-5 | 537 | 40-5 | 14.8K |
| 30-6 | 335 | 40-6 | 9.13K |
| 30-7 | 206 | 40-7 | 5.67K |
| 35 | 129 | 50 | 121 K |
| 36 | 11.3K | 60 | 5K |

Voltages

| | |
|---|---|
| Zener-diode | = 6.6 VDC |
| T1 | = .893 VDC |
| T2 | = 1.502 VDC |
| T3 | = 1.935 VDC |
| T4 | = 2.234 VDC |
| T5 | = 2.422 VDC |
| T6 | = 2.539 VDC |
| T7 | = 2.611 VDC |
| Ind. Con. Sig | = 1.25 VDC/10,000 Ft. |

The values of the resistors which determine the voltage transmission ratio are calculated by a simple process. First the slope of the pressure transducer is calculated for each segment of the piece-wise linear curve. For example, the slope of this curve is 0.833 VDC per 10,000 feet from sea level to 10,000 feet; 0.609 VDC per 10,000 feet from 10,000 to 20,000 feet; etc., according to a well known characteristic of atmospheric pressure versus altitude. Next, the gain of the amplifier for each segment is calculated so that the net slope equals 1.25 VDC per 10,000 feet. The required gain varies in the range of 1.5 to 28 from the first to the last incremental 10,000 feet. Next, the ohmic value of the parallel combination of resistors necessary to achieve this gain is calculated. For example, the gain of 1.5 is achieved in accordance with the equation $G = 1 + R_F/R_I$ by setting $R_F$ (i.e. resistor 20) equal to 60.4K and $R_I$ (i.e. resistor 50) equal to 121K.

The values of the resistors which determine the breakpoints are calculated by the simple process of selecting a suitable bias current, say 0.35 milliamps, which is then divided into the desired breakpoint voltages to yield the successive resistor values.

It should be noted that many modifications can be made to the above-described specific embodiment which are within the scope of the present invention. For example, FIG. 3 illustrates an alternative embodiment for linearizing a pressure transducer indication of altitude. In this alternative embodiment a T-connected network provides negative feedback around an operational amplifier 100. The leg of the T network includes a plurality of resistors R (only one shown) each connected to a common node 102' and each connectable to a source of a breakpoint voltage ($e_{B.P.}$) respectively through one of blocks 10. In this alternate embodiment the pressure transducer is coupled to the inverting amplifier input terminal through a resistor $R_f$. Another resistor $R_I$ couples a source of voltage $-e_{OFF}$ to the inverting amplifier input terminal so that the amplifier produces 0 VDC at sea level. Like the specific embodiment described above, this alternate embodiment has a non-linear voltage transmission characteristic made up of a plurality of linear segments.

It should also be noted that the n-p-n transistors used in the specific embodiment above can be replaced by p-n-p transistors if desired so long as appropriate reversals are made to the power supply connections and the like. Also, it is not necessary to connect the collector electrode of transistor 10A directly to its base electrode. That transistor will operate as a diode if its collector electrode is floated or not used. In fact the transistor could be used in an inverted connection whereby the emitter electrode floats and the base-collector electrode is used as a diode. The connection shown in FIG. 2 is preferable however because of its accurate temperature compensation of the circuit and its low forward-biased resistance.

What is claimed is:

1. An analog function generator controlled by a first voltage signal, the function generator comprising:
   circuit means for providing a plurality of threshold voltages;
   a first impedance having a first terminal for receiving the first voltage signal and having a second terminal forming a common node on which a second voltage is developed when the first voltage signal is received, the second voltage differing from the first voltage when current flows through the first impedance;
   a plurality of impedances being connectable in parallel circuit relationship with each other, each of the plurality of impedances being associated with a respective one of the threshold voltages; and
   a plurality of connecting means each for operatively connecting a respective one of the plurality of impedances in series-circuit relationship with the first impedance only while the second voltage has a predetermined polarity with respect to the threshold voltage associated with the respective impedance;
   each respective connecting means comprising
   a current-summing path;
   a transistor connected between the circuit means and the current-summing path in current-gain configuration whereby changes in the current flowing in the current-summing path do not substantially affect the magnitude of the associated threshold voltage;
   a semiconductor device having a junction connected in series-circuit relationship with the respective impedance and between the common node and the current-summing path, the semiconductor device having unity-current-gain while the junction is forward-biased and substantially no current-gain otherwise, the junction being connected so that it is forward-biased only while the second voltage has the predetermined polarity.

2. The function generator as defined in claim 1 wherein each semiconductor device in the respective connecting means is a transistor having a base-emitter junction connected between the common node and the respective current-summing path.

3. The function generator as defined in claim 1 wherein each semiconductor device in the respective connecting means is a transistor having emitter, base, and collector electrodes, the base and collector electrodes being connected together to operate at a common potential.

4. The function generator as defined in claim 1 wherein the circuit means for providing each threshold voltage comprises a substantially constant voltage source and a resistor divider network having a tap for each different threshold voltage.

5. Apparatus comprising in combination:
a. an operational amplifier having at least one amplifier input terminal and having an amplifier output terminal on which it produces a first voltage,
b. a source producing an analog signal,
c. means for coupling the source to an amplifier input terminal,
d. circuit means for providing a threshold voltage,
e. a first impedance having a first terminal receiving the first voltage and having a second terminal forming a common node on which a second voltage is developed, the common node being coupled to an amplifier input terminal to form a negative feedback loop,
f. a second impedance, and
g. connecting means for operatively connecting the second impedance in series-circuit relationship with the first impedance only while the second voltage has a predetermined polarity with respect to the threshold voltage, the connecting means comprising
a current summing path,
a transistor connected between the circuit means and the current-summing path in current-gain configuration whereby changes in the current flowing in the current summing path do not substantially affect the threshold voltage, and
a semiconductor device having a junction connected in series-circuit relationship with the second impedance and between the common node and the current summing path, the semiconductor device having unity-current-gain while the junction is forward-biased and substantially no current gain otherwise, the junction being connected so that it is forward-biased only while the second voltage has the predetermined polarity.

6. Apparatus in accordance with claim 5 further comprising circuit means for providing at least one additional threshold voltage; a respective impedance associated with each additional threshold voltage; and a respective connecting means for operatively connecting the associated impedance in series-circuit relationship with the first impedance only while the second voltage has a predetermined polarity with respect to the associated voltage.

7. Apparatus in accordance with claim 6 wherein each semiconductor device in the respective connecting means is a transistor having a base-emitter junction connected between the common node and the respective current-summing path.

8. Apparatus in accordance with claim 6 wherein each semiconductor device in the respective connecting means is a transistor having emitter, base, and collector electrodes, the base and collector electrodes being connected together to operate at a common potential.

9. Apparatus in accordance with claim 6 wherein the source comprises a transducing-indicating device which produces the analog signal, the analog signal having a magnitude which is a non-linear indication signal, and wherein the impedances are resistances having predetermined values for linearizing the amplifier output signal.

* * * * *